United States Patent [19]
Pearson

[11] 3,983,269
[45] *Sept. 28, 1976

[54] DURABLE PRESS COMPOSITION AND PROCESS

[76] Inventor: Glenn A. Pearson, 1311 Delaware Ave., S.W., Washington, D.C. 20024

[ * ] Notice: The portion of the term of this patent subsequent to May 13, 1992, has been disclaimed.

[22] Filed: Sept. 30, 1974

[21] Appl. No.: 510,758

Related U.S. Application Data

[63] Continuation-in-part of Ser. Nos. 324,156, Jan. 16, 1973, Pat. No. 3,883,462, Ser. No. 324,157, Jan. 16, 1973, abandoned, Ser. No. 324,158, Jan. 16, 1973, abandoned, and Ser. No. 224,250, Feb. 7, 1972, abandoned, which is a continuation of Ser. No. 109,035, Jan. 22, 1971, abandoned, which is a continuation of Ser. No. 763,981, Sept. 30, 1968, abandoned.

[52] U.S. Cl. .......................... 427/370; 260/29.4 R; 260/70 R; 260/70 A; 260/70 M; 260/71; 260/72 R; 260/17.3; 260/849; 260/850; 427/389; 427/390; 427/391; 427/392; 428/264; 428/265; 428/290

[51] Int. Cl.$^2$ ................. B05D 3/12; C08L 61/20; D06M 15/12

[58] Field of Search .......... 260/29.4 R, 70 R, 70 A, 260/70 M, 71, 72 R; 427/370, 389, 390, 391, 392; 428/264, 265, 290

[56] References Cited
UNITED STATES PATENTS

| | | | |
|---|---|---|---|
| 2,626,251 | 1/1953 | James et al. | 260/70 M |
| 3,883,462 | 5/1975 | Pearson | 260/94.2 R |

*Primary Examiner*—Lewis T. Jacobs
*Assistant Examiner*—H. H. Fletcher
*Attorney, Agent, or Firm*—Lowe, King, Price & Markva

[57] ABSTRACT

Durable crease and wrinkle resistance properties are permanently imparted to fabrics and garments by treating the same with a novel composition prepared by reacting a urea with a condensation product of an aldehyde, an amine and phosphoric acid under curing conditions.

9 Claims, No Drawings

DURABLE PRESS COMPOSITION AND PROCESS

CROSS-REFERENCES TO RELATED APPLICATIONS

This application is a continuation-in-part of my earlier field applications Ser. No. 324,156, filed Jan. 16, 1973 now U.S. Pat. No. 3,883,462, issued May 1975; Ser. No. 324,157, filed Jan. 16, 1973 now abandoned; Ser. No. 324,158, filed Jan. 16, 1973 now abandoned; and Ser. No. 224,250, filed Feb. 7, 1972 now abandoned, the latter application being a continuation of Ser. No. 109,035, filed Jan. 22, 1971, now abandoned, which in turn was a continuation of application Ser. No. 763,981, filed Sept. 30, 1968, and now abandoned.

BACKGROUND OF THE INVENTION

1. Field of the Invention

This invention relates to a new chemical composition and the treating of textiles, e.g., fabrics, woven and nonwoven fibers, yarns, etc., as well as finished garments, therewith for purposes of imparting delayed cure, wrinkle resistance, finish, durable crease, stability, etc. to the treated material.

2. Description of the Prior Art

Numerous agents have been described in the art for such treatment of textiles or of garments manufactured therefrom. These garments are the so-called permanent press or durable press type. The usual treating procedure involves treating the textile with a thermosetting resin and then curing either the textile itself or the garment cut therefrom, usually by the application of heat.

Thermosetting resins described in the prior art are typified by formaldehyde condensation products of various types e.g., dimethylol isopropyl carbamate (SRRL — U.S. Department of Agriculture); formaldehyde-hydroxylamine or hydrazine — U.S. Pat. No. 2,161,808; formaldehyde condensed with dimethyl ether of dimethylol urea — U.S. Pat. No. 2,825,710; condensation products of formaldehyde-dihydrazides of acidic and diglycolic acids — U.S. Pat. No. 2,904,387; dimethylol ethylene urea and a polymeric acetal — U.S. Pat. No. 3,015,584. In U.S. Pat. No. 2,974,432 there is described a process in which the resin is applied to the formed garment and the treated garment itself cured. Excellent work in the area of cotton research, carried out at the Southern Utilization Research and Development Division of the Agricultural Research Service, U.S. Department of Agriculture, includes the development of chemicals for imparting durable crease and wrinkle resistance to cottons, and its annotated bibliographies represent very thorough compilations of the patent and literature art on this subject.

Various prior art patents have issued which are concerned with the preparation of aqueous resin compositions and the use of such compositions for imparting permanent press characteristics to fabrics and garments. Patents of this type of which applicant is aware include U.S. Pat. Nos. 2,626,251; 2,657,132; 2,722,523; 2,829,126; 3,397,077 and 3,645,973. While a great many patents have issued in the art of imparting permanent press characteristics to garments and fabrics, the above-listed patents represent those which are most pertinent to the present invention. In particular, U.S. Pat. No. 2,626,251 to James et al discloses the preparation of water soluble cationic resins comprising reacting urea and its homologues with an aldehyde and an amine including alkanolamines. Alternatively, an inorganic acid may be included in the reaction to reduce the pH values of such compositions. The resins described in this patent are said to be useful for textile applications where a high order of washability is desired. The other patents in this group contain similar disclosures.

The present invention is considered to provide an improvement over prior art disclosures of this type in the provision of novel aqueous compositions and their use in treating textiles, fabrics and garments to provide permanent press products which are characterized by improvements in finish, durability, fastness, crease resistance, and the like.

SUMMARY OF THE INVENTION

It is accordingly one object of this invention to provide a novel composition useful for the treatment of fabrics and garments to impart permanent press characteristics thereto.

It is another object of this invention to provide a simplified method of producing water-soluble urea-formaldehyde resinous systems having consistent uniformity from batch to batch.

It is another object of this invention to provide an aqueous resinous system which is compatible with various additives, permitting modification of the system to meet the requirements of various diverse applications.

It is another object of this invention to provide an aqueous resinous system which is air or heat curable to a tough, clear, insoluble, and infusible coating.

It is another object of this invention to provide an aqueous resinous system which is air or heat curable and which has a high degree of flame retardancy.

It is another object of this invention to provide an aqueous resinous system which has excellent adhesive properties.

It is another object of this invention to provide an aqueous resinous system which is air or heat curable to a tough, colorless, insoluble, and infusible resin, and which is completely compatible with textile fabrics permitting its use as a permanent press or wrinkle-resistant finish.

A still further object of this invention is to provide a method for the treatment of textile fabrics and garments by application of a novel aqueous composition and curing to impart a permanent and durable finish and crease resistant characteristics to the fabrics and garments.

Other objects and advantages will become apparent as the description thereof proceeds.

In satisfaction of the foregoing objects and advantages there is provided by this invention a novel composition for the treatment of textiles to impart outstanding finishes thereto, the composition comprising an aqueous solution formed by the reaction of the condensation product of an aldehyde, an amine and an inorganic acid, with a urea. Also provided is a method for use of this aqueous composition in the treatment of textiles, comprising treating the textile with an aqueous solution of the reaction product of a urea and a condensation product prepared by reacting an aldehyde, an amine and an inorganic acid, and thereafter drying and curing the treated textile.

DESCRIPTION OF THE PREFERRED EMBODIMENTS

It has now been found that an improved chemical composition for the treating of textiles is prepared by reacting a urea with a condensation product formed by reacting a solution of an aldehyde, a water-soluble polyolamine and an inorganic acid, e.g. phosphoric acid or salt thereof. The reaction to form the condensation product is carried out under acid conditions and preferably in the presence of a suitable condensation catalyst.

Urea, thiourea, ethylene urea, dimethylol ethylene urea, dimethylol propylene urea, dimethylol dihydroxy ethylene urea, or other substituted urea may be employed. As an aldehyde, one may use a simple aldehyde such as formaldehyde, acetaldehyde, paraldehyde, glyoxal, or other mono-, di-, or poly- aldehydes. In addition, any substance yielding or acting as an aldehyde may be used. Formaldehyde is the preferred aldehyde as it is conveniently obtained commercially as a 37 weight percent aqueous solution. The amine may be an alkyl, aromatic, hydroaromatic, or acidyl amine, substituted or not. Especially preferred are the polyolamines, the water-soluble polyalkylol amines being the most preferred, specifically triethanolamine, diethanolamine, etc. or mixtures thereof, e.g., 80–85% commercial TEA. Of the inorganic acids which may be used, phosphoric acid or its salts, e.g., ammonium phosphates, or substances yielding phosphoric acid, are particularly preferred. However, other acids such as HCl and $H_2SO_4$ may also be used.

The amount of the essential reactants which take part in formation of the aqueous condensation product of the present invention are as follows:

| COMPONENT | PARTS BY WEIGHT |
|---|---|
| Aldehyde | 40 to 60 |
| Amine | 2 to 8 |
| Inorganic Acid | 3 to 7 |

The most preferred ratios of reactants within the above general formulation comprise 50 parts by weight aldehyde, 4–5 parts by weight inorganic acid and 5–6 parts by weight of polyolamine. On a molar basis a ratio of aldehyde to polyolamine of about 1:2 to 20:1, preferably 6 to 10:1 is preferable.

This condensation product is then reacted with a urea as described above. The amount of urea reacted with the condensation product should be about 15–35 parts of the urea per 100 parts of condensation product and preferably about 25 parts of urea per 100 parts of condensation product. The mole ratio of condensation product resulting from the reaction of the formaldehyde, inorganic acid and alkanolamine to urea should range from about 0.2:1 to 10:1 and preferably 2:1 to 5:1.

The reaction for preparation of the resinous product is carried out at an acid pH. In actual preparation of the condensation product, the aldehyde, amine and inorganic acid are mixed at the natural pH of the system. However, for longer pot life or for use on textiles, it is preferred to then raise to a pH of about 4.5 to 5.5 by the addition of a buffer such as sodium borate or other known buffer solution such as alkali metal phosphates. This pH range provides a more stable solution.

After the condensation product is prepared, it is preferred to permit it to stand at room temperature for a period of preferably 1 hour up to about 2 weeks and more preferably 1 week before reaction with the urea; even though solutions of about 5 months' aging still showed good performance. It is found that a more durable finish is imparted to goods treated with a reactant prepared from condensation product which has been so permitted to stand. The condensation product then is brought together with urea under ordinary conditions at room temperature and normal pressure. Once again, it is preferred that the final solution, for best results, be permitted to stand for a period of time before application to the textile. Such standing, however, should preferably not exceed two days at room temperature.

After the urea is reacted with the condensation product, an aqueous solution is formed by adding about two to four times the amount of water. To this solution may be added various additives in desired amounts such as softeners, wetting agents and the like. A particularly preferred aqueous composition will contain about 10–20 weight percent softener. It is also advantageous to include about 4–5 weight percent of polyvinyl acetate in the composition as this material has been found to provide additional body to the final product by its reaction with the polymer. Also addition of the polyvinyl acetate has been found to provide a better crease.

A critical aspect of the invention resides in the sequence of addition or reaction of the components. Thus, it is necessary that the condensation product be formed initially and thereafter reacted with the urea in a separate step. If the sequence of reactions as set forth herein is not followed, the outstanding results of the invention are not achieved. The proportions of components to be used are also critical. The reaction of aldehyde and catalyzing acid is exothermic and occurs substantially immediately upon the mixing of the two reactants. Apparently the catalyzing acid-aldehyde reaction medium acts as a diluent for the reaction between the alkanolamine and catalyzing acid-aldehyde reaction product leading to substantially immediate and complete exothermic reaction. Urea, which is added last, reacts consistently at the same reaction sites, believed to be with the hydroxyl groups of the alkanolamine and residual hydroxyl groups formed by the excess of the aldehyde. The reaction proceeds smoothly and is extremely rapid to provide a viscous, syrupy, water-white, aqueous, resinous solution. The resinous solution is stable at room temperature and remains stable when stored in bulk without substantial increase in viscosity for prolonged periods, i.e., up to about six weeks or longer. However, when the solution is applied as a thin film and/or as a casting, preferably with the addition of catalyzing materials, it will air cure or cure with application of heat to a water-white, insoluble, and infusible plastic. Although it is not intended to be limited by any theoretical explanation, it is believed that by using the designated ratios, and through the sequential steps of reactions a three-dimensional cagelike molecular structure is consistently obtained. This cagelike molecular structure provides or contributes to the unique character of the defined resinous system.

The catalyzing acid is essential to the reaction of the present invention, and it is essential that the acid be mixed with the aldehyde before addition of alkanolamine and urea. Although all strong inorganic acids such as hydrochloric acid, sulfuric acid and phosphoric acid are operable, phosphoric acid is definitely preferred. Phosphoric acid as the catalyzing acid not only results in a very rapid, but controllable reaction, it also provides an aqueous resinous solution which has good shelflife and consistency. Further, the resultant product has good fire-retardancy properties.

Although the aqueous resinous system of this invention can be used as such in or as coatings, moldings, adhesives, or the like, a characteristic feature of the resinous system is its compatibility with various accelerators and modifiers to permit the use of the resinous system in diverse applications particularly textiles. More specifically, the resinous system is compatible with bromine. When bromine is added in from 1 to 15 parts per 100 parts of resin, excellent fire retardancy is imparted to the resin permitting its use in the impregnation of papers, textiles, building tiles, and the like, to provide a flame-resistant and flame-retardant product;

the resinous system is compatible with other catalyzing agents including additional amounts of inorganic acids such as phosphoric acid, hydrochloric acid, and sulfuric acid, and also catalysts such as ammonium phosphate and ammonium sulfamate. When these catalysts are added to the resinous system in amounts of from 1 to 10 parts per 100 parts of resin, extremely rapid cure of the resinous system is obtained without adverse influence upon the final product when used as adhesives, protective coating, or as a fabric impregnate to impart permanent-press and wrinkle-resistant properties to the fabric as well as fire retardancy;

the resinous system is compatible with other chemicals permitting further modification of the system to meet diverse requirements. For example, when from 1 to 10 parts phenol are added to the resinous system, the cure rate of the resinous system is accelerated both at room and elevated temperatures to provide a product having superior adhesive properties and strength;

the resinous system is compatible with conventional fillers, pigments, and lubricants commonly employed in polymer systems such as clays, ground limestone or white gypsum, talc, cellulose, aluminum hydrate which imparts flame-resistant characteristics; chopped glass fibers, asbestos, and other synthetic fibers such as nylon, polyesters, and acrylic fibers; finely divided carbon to impart electrical conductivity to the polymer, titanium oxide pigments, dyes, as well as the conventional mold lubricants such as zinc stearate and the like. Additionally, the resinous system is compatible with highly acid or alkaline fillers, permitting use of the resinous system in various structural components including panelling, tile blocks, and the like. For example, 200 parts "red mud" which is a highly alkaline residue obtained as a by-product when aluminum is extracted from bauxite by the Bayer process, consisting largely of complex sodium aluminum silicates and iron oxide, was admixed with 100 parts of the resin and applied to a panel and cured to provide a decorative and structurally improved panel.

Various other materials can be admixed with the resinous system of the present invention to provide unique characteristics.

While the compositions of the present invention are useful in a number of areas, the most unique and advantageous results are achieved in the treatment of textiles, i.e. fabrics or garments, to impart permanent press charcteristics thereto including improvements in the finish, durability and crease resistance.

The treatment of the fabric textile or garment is carried out in a manner well known and established in the art. The textile must be thoroughly saturated with the urea-condensation product solution. This can be accomplished in flat goods by the normal padding technique. Preferably the pads should have two dips and two nips. Alternatively, the textile may be placed in a container containing the treating agent, soaked and then extracted by spin or squeeze methods to the proper wet pickup. The wet pickup varies between 60 weight percent and 110 weight percent depending upon the textile treated and/or the finish desired. The material is then dried by suitable means such as tenter frame, cans, air dry, or tumble dry. Preferably at this stage the temperature of the fabric should not exceed about 250°F. and the material should be dried to a moisture content of not less than 3% and preferably not less than 6 percent.

The curing of the treated material is carried out in the normal manner known to the art, e.g., by exposing the treated material to a temperature of 250°F.–400°F., preferably 300°F. to 350°F. for a period of time varying from 15 secnds to 5 minutes, preferably at a temperature of 325°F. to 335°F. for a period of 1 to 5 minutes. The amount of cure, of course, depends upon the fabric and the type of fiber contained therein; for example, lightweight 3.25 yd. all cotton broadcloth can be cured in a shorter time on a tenter frame than it can be when using the "Koratron" type of oven curing which would require a higher temperature and a longer curing time since several layers of a garment must be affected by the cure.

It has been found that contrary to experience with other treating agents, the thermosetting resin of this invention can be applied equally as well to cotton, nylon-cotton blends, polyester-cotton blends, flax, wool, polypropylene, wool-nylon blends, rayon and jute. No textile materials have been treated to date which do not show favorable properties after treatment with this resin. It is also possible to treat fibers with the resin of this invention prior to spinning and also to treat plied yarns prior to weaving. For example, Leesona 553 Uptwister can be used to produce stretch cotton yarn. Any yarn which is non-thermoplastic can likewise be treated with the resin of this invention and processed as above (false twisting or by the twist-detwist method) to impart stretch to the yarn.

After the cure, additional treatments usually applied in the finishing of textile materials can be imparted to fabrics treated by the resin of this invention, e.g., decating, use in treating woolen goods, bleaching dyeing, calendering, etc.

Textile fabrics treated by the method of this invention display permanent press and other like properties at least equal to, and in most instances far superior to those obtained by treating the same textile with other known resins and methods. The treated and cured textiles had excellent absorbency qualities, soft hand, dry and wet crease resistance, stability, crease retention, minimum fiber, yarn and fabric degradation, soil release ability, and durability of finish in face of repeated home washings, dry cleanings and dryings. After the textile is cured, the fabric may be dyed or bleached using standard finishing techniques.

The aqueous resinous systems of this invention provide numerous advantages in the treatment of textile materials as indicated above. However, the most important and advantageous properties reside in improvements in the finish of the textile, durability of the finish, retention of creases after repeated washings and improvements in the inflammability characteristics of the fabric. Thus, with respect to crease retention and durability, it has been found that after textiles are treated in accordance with this invention, that even after repeated washings, the fabric does not show significant loss in weight. Moreover, the compositions possess the unique property of restoring the finish to warn garments so that durability of the entire garment is increased.

Without attempting to explain the mechanism of the chemical reactions involved in the use of the novel composition resulting from applicant's solutions the following is postulated with respect to the preferred reactants. However, the invention is not to be considered as limited to this mechanism.

Triethanolamine is converted to a salt by reaction with phosphoric acid splitting off water and resulting in a structure bearing the typical formula:

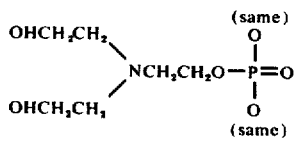

If diethanolamine is used the amino nitrogen is linked directly to the P atom as:

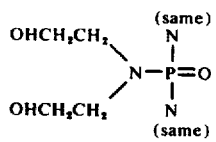

If mixtures of TEA and DEA are used, mixtures of the above are obtained.

Now, one or more mols of formaldehyde adds on to the OH groups and the N- part of the molecule assumes the structure of a formula:

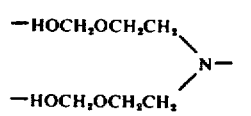

When urea is added to the solution mixture and the mixture subjected to the time and temperature conditions of the cure, it is theorized that the urea reacts at the OH groups splitting off water and forming a structure as follows:

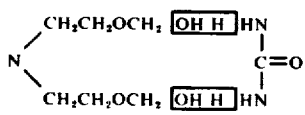

The final product is a highly cross-linked molecule of the structure (using an alkyl triolamine and unsubstituted urea as examples)

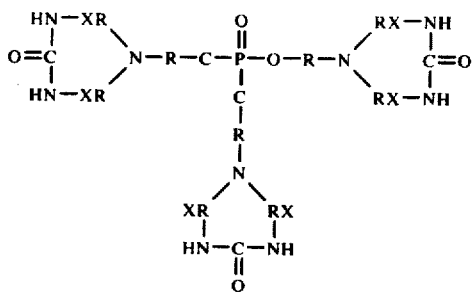

Where R = alkylene of 1–6 carbon atoms and X = $(CH_2O)_{1-10}$

The final product in the case of an alkyldiolamine and unsubstituted urea is postulated to be a compound of the formula:

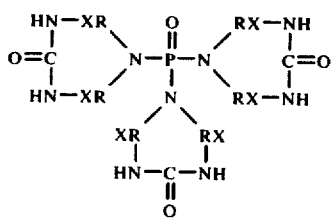

and where R = alkylene of 1–6 carbon atoms and X = $(CH_2O)_{1-10}$

As used in the appended claims, the following terms have the following meanings:

"textile" means a fiber, yarn, thread or other form thereof, and fabrics manufactured therefrom, either woven or non-woven, regardless of the chemical constituency of the same, e.g., cellulosic, proteinaceous, polyolefinic, etc.;

"aldehyde" means a simple aldehyde and substances yielding and acting as aldehydes;

"phosphoric acid" means phosphoric acid, salts and esters thereof and substances yielding phosphoric acid upon decomposition;

"urea" means urea and substituted ureas, e.g., thiourea, alkylene ureas, etc.

The following examples are presented to illustrate the invention but it is not to be considered as limited thereto. In the examples and throughout this specification, parts are by weight unless otherwise indicated.

EXAMPLE I

A. Preparation of Condensation Products

1. A condensation product was prepared by reacting 3608 grams of formaldehyde (37% solution), 450 grams triethanolamine (80%) in the presence of 113 grams HCl (35% solution) and 177 grams phosphoric acid (85% solution). The chemicals were mixed at room temperature and the resulting solution was water clear. This solution was permitted to stand for a period of approximately 1 week. It was observed that during the standing period the odor of the solution became less intense. The resulting solution of condensation product was separated into 20 portions of roughly 220 grams each.

2. Another condensation product was prepared by mixing 24 grams of formaldehyde (37% solution), 4.50 grams triethanolamine, 3.0 grams ammonium phosphate, 1.50 grams $H_2SO_4$ (10%) and 100 grams water. Ammonium hydroxide was added to bring the pH of the mix to 5.0 to 5.5.

B. Preparation of Urea Adduct

1. Urea reaction mixtures were prepared from the above portions by mixing approximately 50 grams of urea, 450 grams of water and 220 grams of condensation product, again at room temperature. Similarly, the solution preferably is permitted to stand 1 to 24 hours, preferably 2 to 12 hours. When a solution was used which stood for more than about 24 hours, cloth treated therewith begins to become "boardy."

2. The condensation product of A(2) above, after standing for 2 days, was mixed at room temperature and pressure with 9.0 grams of urea. This combined solution was then permitted to stand for approximately 1 day before use.

TEXTILE TREATING

The following materials were treated at room temperature with urea reaction products of example B(1) and subsequently cured under curing conditions previously outlined.

Plain weave 100% rayon (fiber 40 warp and filling) dyed gold;
100% combed cotton marquisette;
bleached combed cotton broadcloth;
plain weave bleached cotton;
rose-colored 100% linen;
bleached white 100% linen;
brown 100% wool worsted;
yarn dyed green and brown check, 80% polyester/20% cotton;
bleached cotton hospital gown;
seven men's cotton shirts manufactured from bleached combed broadcloth and printed cotton cloth;
two all cotton gingham shirts.

In all instances the treated and cured fabric at least met and in most instances exceeded the Koratron standards.

In addition, a number of ordinary paper napkins (Hudson) purchased in a local supermarket were treated with the aforesaid solution, washed and dried. The napkins did not disintegrate, remained intact, and presented properties of cast paper.

EXAMPLE II

The resin of this invention has also been found to be applicable to wool as indicated by the following additional examples. A large swatch of brown wool worsted suit material was treated with the solution described in paragraph B(1). The material was cured and a creased imparted thereto with a household hand iron. After repeated washing and tumble dryings the crease was retained and the fabric had a wash-wear rating of 4 (Monsanto method) and no felting or shrinkage was observed. A number of pieces of nylon-wool material used in the manufacture of baseball uniforms was similarly treated and submitted for tests to a commercial woolen mill. The evaluation report indicated that the material did not lose its crease and had a 4+ wash-wear rating (Monsanto method) after repeated washing and tumble-dryings. The fabric remained stable and no felting was observed. A number of cotton crib sheets purchased locally were likewise subjected to the process with the same solutions, and cured and submitted to a bed sheet manufacturer for evaluation. The evaluation report again was favorable indicating no loss of crease or shape retention after repeated washings and dryings including washing in the presence of bleach.

Cotton broadcloth samples were treated with the solution of B(2) above and cured. The cured fabrics in all instances displayed properties of a nature and extent as those obtained with the solution of B(1).

Two unexpected observations were made with respect to fabrics treated with the chemical composition of this invention. Firstly, this method produces the only treated fabric which can be either tumble-dried or line-dried and still display desired physical and appearance properties. Fabrics finished with other treating agents contain instructions that they be either tumble-dried or line-dried but not the other, e.g., Koratron type treated fabrics need be tumble-dried, not line-dried, whereas Belfast type treated materials must be line-dried, not tumble-dried, all in accordance with instructions contained on garments sold commercially. It is postulated the use of the treating agent of this invention permits a balance of the wet and dry crease recovery properties of the fabric. Secondly, it is possible to remove stains from fabrics or garments treated with the chemical composition of this invention indicating that the ability of the treated fabric to absorb moisture is excellent. Bleached, white, cotton broadcloth purposely stained with tomato and meat gravy was washed in a household washing machine. After the washing cycle it was found that most of the stain was removed but that a gray outline remained. The washing process was repeated in the presence of a small amount of household Clorox bleach and the stain was completely removed. The identical procedure was followed with a bleached white blended broadcloth (65% polyester—35% cotton) treated with a commercially available permanent press finish and the stains still persisted therein.

EXAMPLE III

230 Parts aqueous formaldehyde (37 percent non-volatile) and 23 parts aqueous phosphoric acid (85 percent non-volatile) were mixed together. An exothermic and substantially immediate reaction occurred. 28 Parts triethanolamine were added to the formaldehyde/phosphoric acid mixture. The reaction was exothermic and substantially immediate. Thereafter, 70 parts urea were added to the formaldehyde, phosphoric acid, and triethanolamine reaction product to obtain an aqueous resinous system having a non-volatile of approximately 58 percent. The entire reaction proceeded without applied heat and was complete in a matter of five minutes, i.e., as rapidly as the materials could be mixed together in the sequence designated. The system was water-clear and relatively viscous. The NMR (nuclear magnetic resonance) curve of the resinous system using tetramethylsilane as an external standard of 0.00 parts per million showed the following: a small broad peak at 3.58; sharp peaks at 3.64 and 3.66; small and broad peaks at 3.86 and 4.30; sharp peaks at 5.02 and 5.16; and a high broad peak at 5.28.

The obtained solution was further diluted with four parts water to one part of resin. The diluted solution was used to wet a 12 × 12 inch sample of white cotton broadcloth until double the dry weight of the cloth was achieved when the material was passed through squeeze rollers or otherwise squeezed to remove excess solution. The cotton material was dried and folded over upon itself and pressed with a hand iron at 325°F. to provide a creased and smooth finish. The weight of the sample was recorded and thereafter the sample washed in a conventional wash machine at about 140°F. with a common detergent and spun dry. The sample was again weighed. Upon completion of ten wash cycles, it was found that the fabric retained permanent-press characteristics with only slight wrinkling and that 95 percent of the resin remained in the cloth, demonstrating its favorable permanent-press and wash-and-wear characteristics.

EXAMPLE IV

To further show the utility of the resinous composition, ten grams aqueous phosphoric acid (85 percent non-volatile) were added to 100 grams of the resin solution and thoroughly mixed. The solution obtained was applied to a wood panel as a thin coating with a paint brush, and the wood panel cured at 250°F. for ten minutes. The coating on the wood panel was uniform, without indication of blistering or the like, and was completely clear, only emphasizing the natural grain of the wood. The wood panel was placed in a water bath maintained at room temperature for a period of eight hours with only part of the panel submerged. The wood panel was withdrawn from the water bath and permitted to dry. After drying, there was no visible effect of the water upon the resin coating. The submerged and unsubmerged portions of the panel were identical. However, where the wood had not been coated, a distinct water line was noted.

EXAMPLE V

This example shows preparation of the most preferred aqueous system and its use in treating textiles.

A condensation product was prepared by mixing at room temperature 2300 grams of 37% aqueous formaldehyde solution, 230 grams of 85% phosphoric acid and 280 grams of 98% triethanolamine. Thereafter, the pH of this solution was raised to 5.5 by the addition of sodium borate (about 1%). After completion of the mixing, and allowing to stand for one day, the resulting solution was added to 25% by weight of urea or 702.5 grams and the mixture was allowed to stand until reaction was completed. There was then added three times the total weight of water or 10536 grams of water. To this resulting mixture was added 4% by weight of the basic solution of polyvinyl acetate (140 grams). Then 10% of a commercial softener and 0.25% of a wetting agent were added.

The resulting solution was found to be stable and of the correct consistency for use in treating textiles. The obtained solution was placed in a container and a well worn pair of weighed 100% cotton trousers were dipped or soaked in the mixture. The soaked trousers were then passed through squeeze rollers to remove excess solution and dried at room temperature. The weight pick-up of resin was then recorded. The trousers were then pressed and creased with a hand iron at 325°F. to provide a creased and smooth finish. Thereafter the trousers were washed in a conventional wash machine at about 140°F. with a common detergent and spun dry. The trousers were again weighed. Upon completion of five wash cycles, it was found that the fabric retained permanent-press characteristics with a good finish and that 98 percent of the resin remained in the cloth, demonstrating its favorable permanent press and wash-and-wear characteristics.

A major and unexpected advantage of the compositions of the invention with respect to the treatment of textiles is that they are capable of restoring the original finish to fabrics with respect to feel and body. This characteristic is especially of value in the treatment of 100% synthetics such as polyesters, polypropylene and polyamides and blends of these synthetic materials with cotton. By treatment of fabrics or garments formed of those materials in accordance with the teachings of the invention, worn fabrics can be restored to original finish and be serviceable. Moreover, they will be wrinkle-free and retain their creases. Further, after treatment, synthetic materials can be cured at higher temperatures, e.g. 325°–350°F., without loss of tensile strength.

The invention has been described herein with reference to certain preferred embodiments. However, as obvious variations thereon will become apparent to those skilled in the art it is not to be considered as limited thereto.

What is claimed is:

1. A method for treating textiles to impart permanent press characteristics thereto which comprises treating the textile with an acidic resinous solution prepared by forming the reaction product of (a) a condensation product prepared by reacting 40–60 parts by weight of an aldehyde, 2–8 parts by weight of a polyalkylol amine and 3–7 parts by weight of a strong inorganic acid, then adding to the condensation product 15–35 parts by weight of a urea, the resinous solution being a stable solution having an acid pH, and thereafter, drying and curing the treated textile.

2. A method according to claim 1 wherein the condensation product is prepared by reacting formaldehyde or a compound acting as an aldehyde, phosphoric acid and a polyalkylolamine by mixing at room temperature.

3. A method according to claim 2 wherein the condensation product is prepared by thorough mixing of the reactants at room temperature and then raising the pH of the resulting mixture to about 4.5 to 5.5.

4. A method according to claim 3 wherein the condensation product is allowed to stand for one day to two weeks before reacting with the urea.

5. A method according to claim 4 wherein the urea is selected from the group consisting of urea, thiourea, ethylene urea, dimethylol ethylene urea, dimethylol propylene urea, dimethylol dihydroxy ethylene urea, or mixtures thereof; the aldehyde is selected from the group consisting of formaldehyde, acetaldehyde, paraldehyde, glyoxal, or mixtures thereof; the amine is a polyolamine selected from the group consisting of triethanolamine, diethanolamine and mixtures thereof; and the inorganic acid is phosphoric acid, an ammonium salt thereof, or mixtures.

6. A method according to claim 5 wherein the textile is a fabric or garment and is pressed and creased prior to curing.

7. A method according to claim 6 wherein the textile is cotton, a cotton-synthetic blend or 100% synthetics.

8. A method according to claim 7 wherein the condensation product is prepared by mixing about 2300 parts of 37% aqueous formaldehyde, about 230 parts 85% phosphoric acid, and about 280 parts 98% triethanolamine, raising the pH of the resulting mixture to 5.5 by the addition of a buffer; thoroughly reacting the resulting mixture with 25% of the weight of the condensation product of urea, allowing the mixture to stand until reaction is completed, adding three times the total weight of water, and then adding softeners, wetting agents and 4 weight percent of polyvinyl acetate.

9. A method according to claim 1 wherein 4–5 weight percent of polyvinyl acetate is added to the final mixture.

* * * * *